US012671266B2

(12) United States Patent
Rang

(10) Patent No.: US 12,671,266 B2
(45) Date of Patent: Jun. 30, 2026

(54) POWER SOURCE SERIALIZATION, DETECTION, AND INFORMATION TRANSMISSION

(71) Applicant: Dell Products L.P., Round Rock, TX (US)

(72) Inventor: Anton Rang, Houlton, WI (US)

(73) Assignee: DELL PRODUCTS L.P., Round Rock, TX (US)

( * ) Notice: Subject to any disclaimer, the term of this patent is extended or adjusted under 35 U.S.C. 154(b) by 431 days.

(21) Appl. No.: 18/336,273

(22) Filed: Jun. 16, 2023

(65) Prior Publication Data

US 2024/0421633 A1 Dec. 19, 2024

(51) Int. Cl.
*H02J 13/12* (2026.01)
*H02J 7/82* (2026.01)
*H02J 105/42* (2026.01)
*H02J 105/50* (2026.01)
*H02J 105/55* (2026.01)

(52) U.S. Cl.
CPC ................. *H02J 13/12* (2026.01); *H02J 7/82* (2026.01); *H02J 2105/425* (2026.01); *H02J 2105/51* (2026.01); *H02J 2105/55* (2026.01)

(58) Field of Classification Search
CPC .. H02J 3/00002; H02J 7/0048; H02J 2310/58; H02J 2310/64; H02J 2310/16
USPC .......................................................... 700/295
See application file for complete search history.

(56) References Cited

U.S. PATENT DOCUMENTS

| | | | |
|---|---|---|---|
| 8,497,779 B1 * | 7/2013 | Waide ..................... G06F 1/263 | |
| | | | 340/636.1 |
| 9,912,164 B2 | 3/2018 | Kumar | |
| 11,226,665 B2 | 1/2022 | Messick et al. | |
| 2013/0049463 A1 | 2/2013 | Shih et al. | |
| 2018/0352517 A1 * | 12/2018 | Dauneria .......... H04W 52/0296 | |
| 2021/0083505 A1 * | 3/2021 | Beaston .................. H02J 3/381 | |
| 2022/0043497 A1 * | 2/2022 | Rathinasamy .......... H04L 12/10 | |

(Continued)

OTHER PUBLICATIONS

Rang, et al. "Power Supply-Based Communication for Detection of a Lack of Redundancy in Power That has Been Supplied to a System" U.S. Appl. No. 18/646,274, filed Apr. 25, 2024, 40 pages.

(Continued)

*Primary Examiner* — Md Azad
(74) *Attorney, Agent, or Firm* — Amin, Turocy & Watson, LLP

(57) ABSTRACT
A system can comprise a processor and a memory that can store executable instructions that, when executed by the processor, facilitate performance of operations comprising generating data comprising a power source identifier to be transmitted as a data transmission; and transmitting, to a power consumer, the data transmission via a power connection from a power source. The data transmission can comprise other information related to the power source. The operations can further comprise receiving one or more consumption data transmissions from one or more power consumers, wherein the one or more power consumers are associated with the power source and comprise the power consumer, and wherein at least one of the one or more consumption data transmissions comprises a consumption indicator associated with the power consumer.

20 Claims, 11 Drawing Sheets

(56)　　　　　　References Cited

U.S. PATENT DOCUMENTS

| 2022/0178975 A1* | 6/2022 | Prisco ................ G01R 19/1659 |
| 2023/0229223 A1 | 7/2023 | Wolford et al. |

OTHER PUBLICATIONS

"IEEE 1901" Wikipedia. [https://en.wikipedia.org/wiki/IEEE_1901], retrieved on Apr. 25, 2024, 7 pages.
"HomePlug" Wikipedia. [https://en.wikipedia.org/wiki/HomePlug], retrieved on Apr. 25, 2024, 8 pages.
Notice of Allowance received for U.S. Appl. No. 18/646,274 dated Dec. 9, 2025, 11 pages.

* cited by examiner

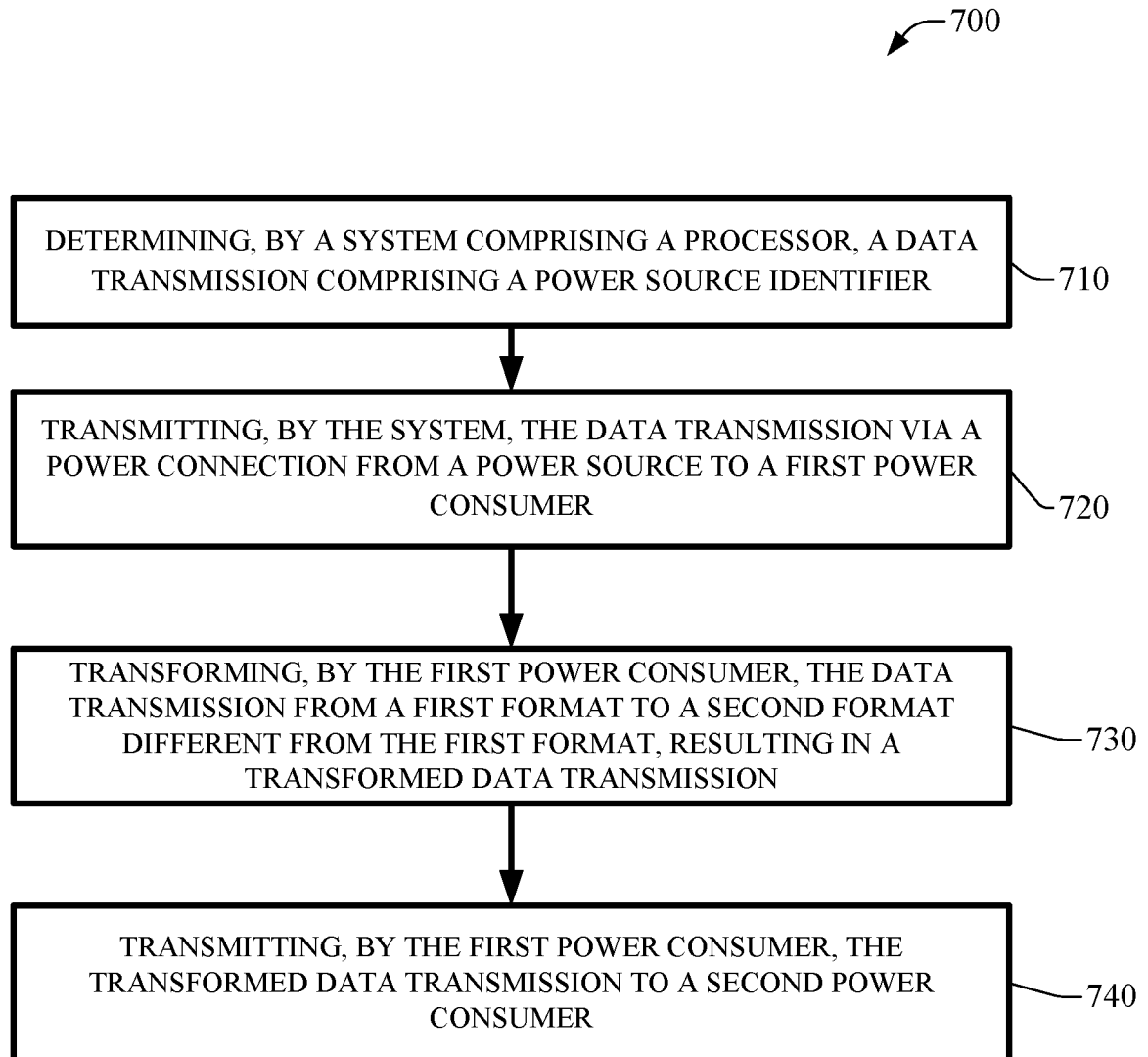

700

DETERMINING, BY A SYSTEM COMPRISING A PROCESSOR, A DATA TRANSMISSION COMPRISING A POWER SOURCE IDENTIFIER ——710

TRANSMITTING, BY THE SYSTEM, THE DATA TRANSMISSION VIA A POWER CONNECTION FROM A POWER SOURCE TO A FIRST POWER CONSUMER ——720

TRANSFORMING, BY THE FIRST POWER CONSUMER, THE DATA TRANSMISSION FROM A FIRST FORMAT TO A SECOND FORMAT DIFFERENT FROM THE FIRST FORMAT, RESULTING IN A TRANSFORMED DATA TRANSMISSION ——730

TRANSMITTING, BY THE FIRST POWER CONSUMER, THE TRANSFORMED DATA TRANSMISSION TO A SECOND POWER CONSUMER ——740

FIG. 7

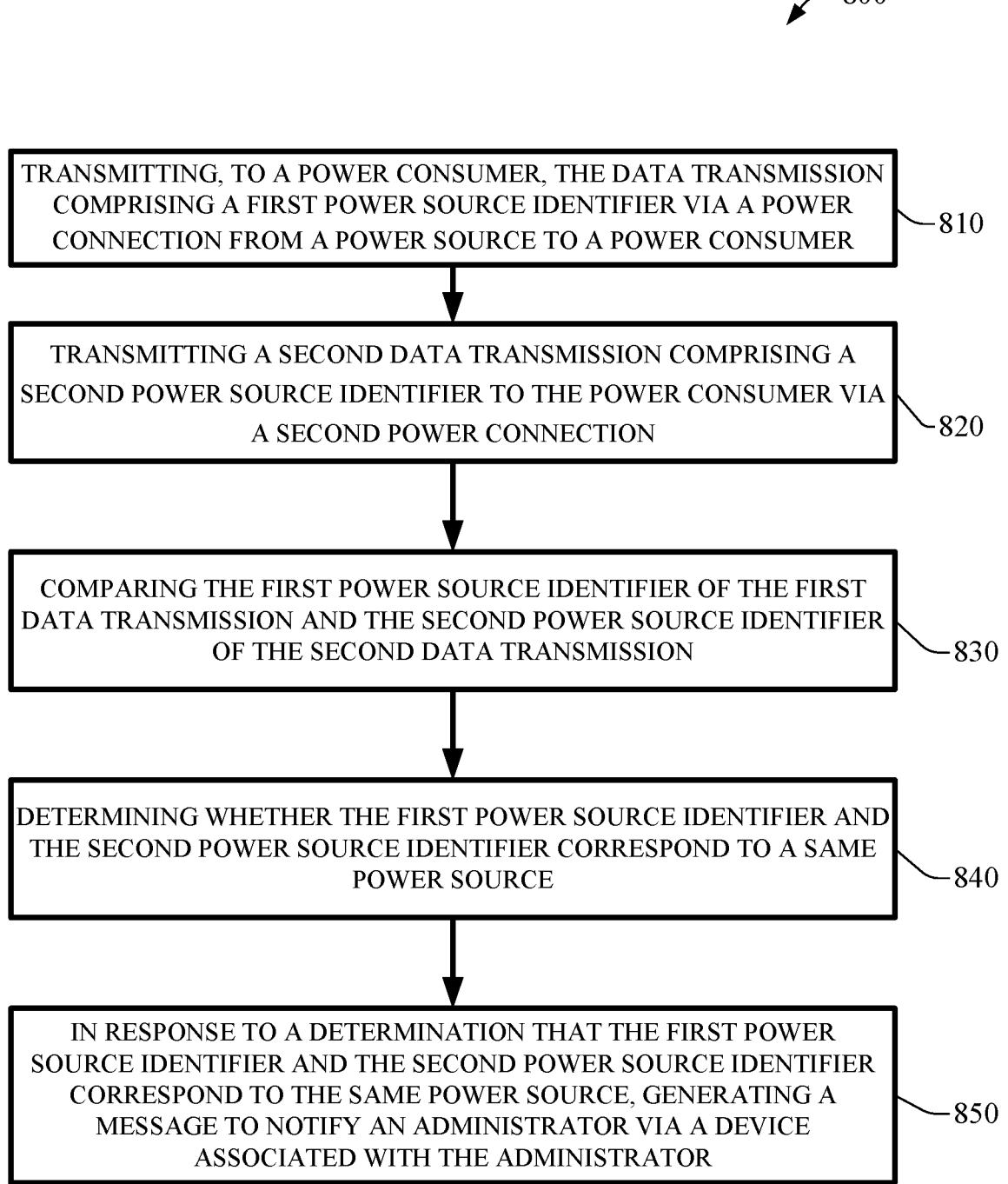

TRANSMITTING, TO A POWER CONSUMER, THE DATA TRANSMISSION COMPRISING A FIRST POWER SOURCE IDENTIFIER VIA A POWER CONNECTION FROM A POWER SOURCE TO A POWER CONSUMER ──810

TRANSMITTING A SECOND DATA TRANSMISSION COMPRISING A SECOND POWER SOURCE IDENTIFIER TO THE POWER CONSUMER VIA A SECOND POWER CONNECTION ──820

COMPARING THE FIRST POWER SOURCE IDENTIFIER OF THE FIRST DATA TRANSMISSION AND THE SECOND POWER SOURCE IDENTIFIER OF THE SECOND DATA TRANSMISSION ──830

DETERMINING WHETHER THE FIRST POWER SOURCE IDENTIFIER AND THE SECOND POWER SOURCE IDENTIFIER CORRESPOND TO A SAME POWER SOURCE ──840

IN RESPONSE TO A DETERMINATION THAT THE FIRST POWER SOURCE IDENTIFIER AND THE SECOND POWER SOURCE IDENTIFIER CORRESPOND TO THE SAME POWER SOURCE, GENERATING A MESSAGE TO NOTIFY AN ADMINISTRATOR VIA A DEVICE ASSOCIATED WITH THE ADMINISTRATOR ──850

FIG. 8

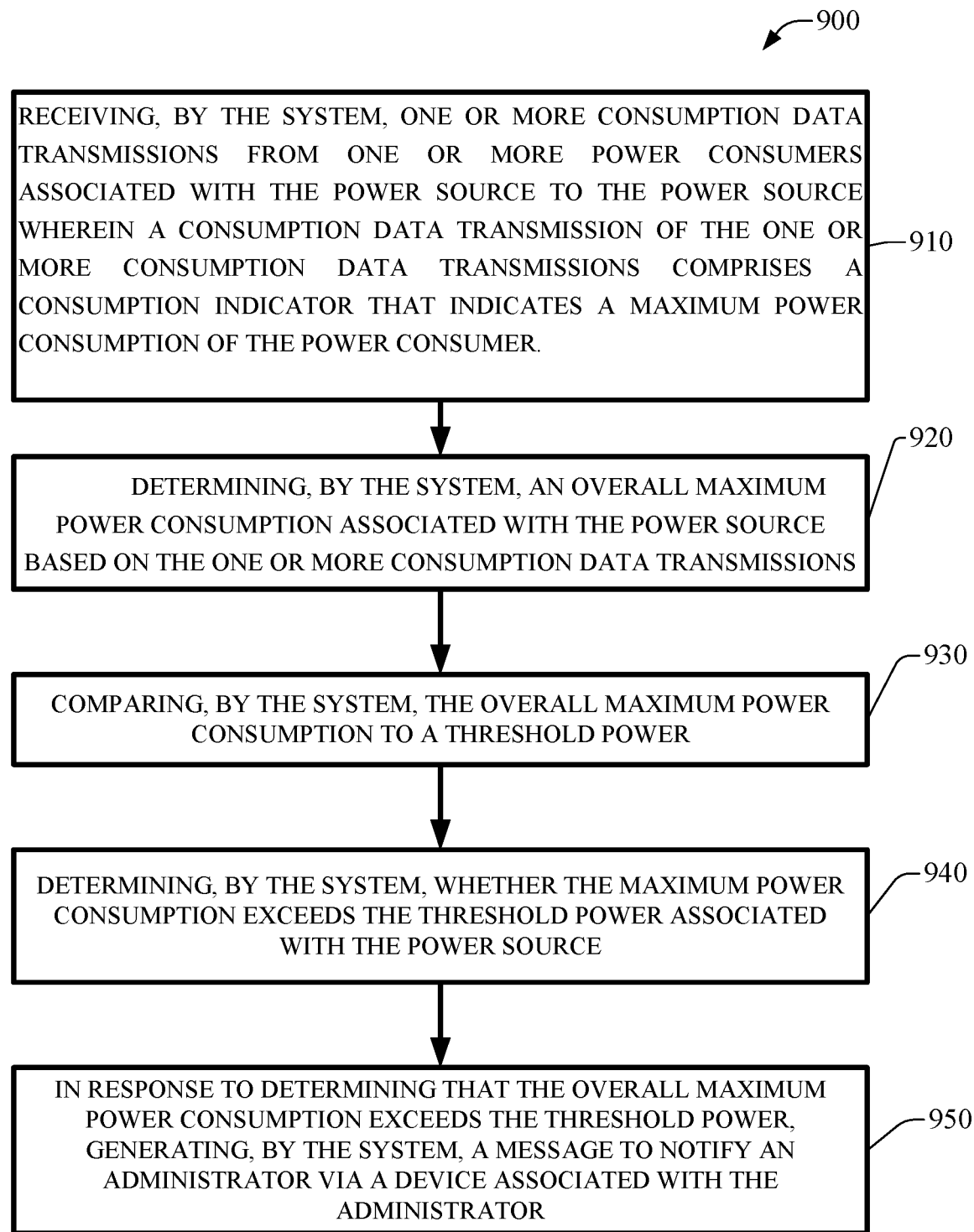

900

RECEIVING, BY THE SYSTEM, ONE OR MORE CONSUMPTION DATA TRANSMISSIONS FROM ONE OR MORE POWER CONSUMERS ASSOCIATED WITH THE POWER SOURCE TO THE POWER SOURCE WHEREIN A CONSUMPTION DATA TRANSMISSION OF THE ONE OR MORE CONSUMPTION DATA TRANSMISSIONS COMPRISES A CONSUMPTION INDICATOR THAT INDICATES A MAXIMUM POWER CONSUMPTION OF THE POWER CONSUMER. — 910

DETERMINING, BY THE SYSTEM, AN OVERALL MAXIMUM POWER CONSUMPTION ASSOCIATED WITH THE POWER SOURCE BASED ON THE ONE OR MORE CONSUMPTION DATA TRANSMISSIONS — 920

COMPARING, BY THE SYSTEM, THE OVERALL MAXIMUM POWER CONSUMPTION TO A THRESHOLD POWER — 930

DETERMINING, BY THE SYSTEM, WHETHER THE MAXIMUM POWER CONSUMPTION EXCEEDS THE THRESHOLD POWER ASSOCIATED WITH THE POWER SOURCE — 940

IN RESPONSE TO DETERMINING THAT THE OVERALL MAXIMUM POWER CONSUMPTION EXCEEDS THE THRESHOLD POWER, GENERATING, BY THE SYSTEM, A MESSAGE TO NOTIFY AN ADMINISTRATOR VIA A DEVICE ASSOCIATED WITH THE ADMINISTRATOR — 950

FIG. 9

POWER SOURCE SERIALIZATION, DETECTION, AND INFORMATION TRANSMISSION

BACKGROUND

Data storage centers can use redundant power sources for added reliability. An error in cabling can lead to multiple power supplies being mistakenly connected to the same power source.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can generate data comprising a power source identifier to be transmitted as a data transmission. The system can further transmit, to a power consumer, the data transmission via a power connection from a power source.

An example method can comprise determining, by a system comprising a processor, determining, by a system comprising a processor, a data transmission comprising a power source identifier; and transmitting, by the system, the data transmission via a power connection from a power source to a power consumer.

An example non-transitory computer-readable medium can comprise instructions that, in response to execution, cause a system comprising a processor to perform operations. These operations can comprise identifying a power connection from a power source to a power consumer and transmitting a data transmission comprising a power source identifier via the power connection from the power source to the power consumer.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 7 illustrates another example process flow that can facilitate communication between a power source and associated power consumers, in accordance with an embodiment of this disclosure;

FIG. 8 illustrates another example process flow that can communication between a power source and associated power consumers, in accordance with an embodiment of this disclosure;

FIG. 9 illustrates another example process flow that can communication between a power source and associated power consumers, in accordance with an embodiment of this disclosure.

DETAILED DESCRIPTION

Figure 1:
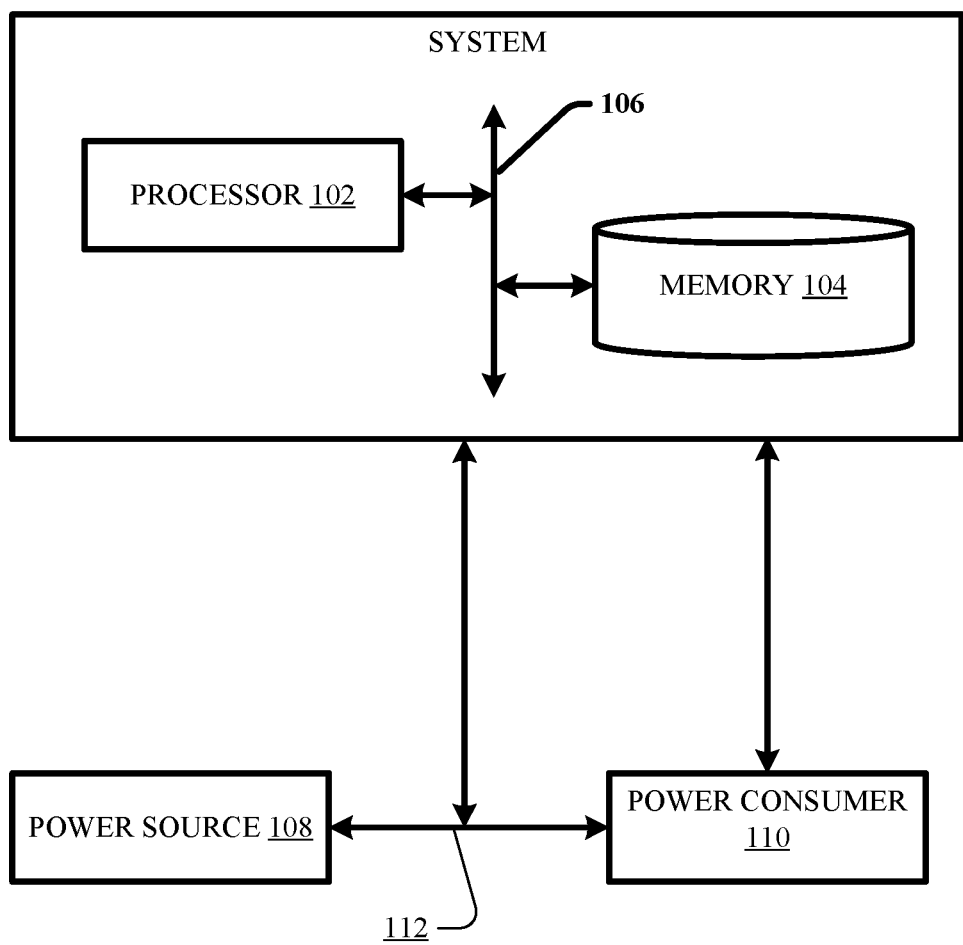
FIG. 1 illustrates an example system architecture that can facilitate communication between a power source and associated power consumers, in accordance with an embodiment of this disclosure.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. In other instances, well-known structures and devices are shown in block diagram form in order to facilitate describing the subject disclosure.

Overview

Data centers are physical spaces that house information technology infrastructure such as servers, data storage devices, and network switches. Continued operation of such infrastructure is vital to an organization's or other entity's information technology operations. Even a brief interruption to the power connection of information technology infrastructure can cause costly delays in operations. To decrease the chance of power loss to equipment in a data center, various pieces of equipment can be connected to two or more power supplies that are connected to two or more different power sources. The different power sources can be uninterruptable power sources (UPS) or other independent power sources. For example, a data storage device may be connected to be able to receive power from both line power and a battery. The data storage device can operate from battery power in a case where the line power fails, and vis versa. The data storage device is therefore configured with redundant power sources.

The physical equipment housed in a data center is often connected to a power source and other infrastructure components via physical cables. Various pieces of equipment may comprise several cable connection ports. The data center likely houses a large number of cables intended to be connected to various pieces of equipment within the data center. An operator may be responsible for making proper cable connections for the various pieces of equipment within the data center. Due to the large number of cable connections often present in a data center, an operator may be susceptible to making cabling mistakes. Such mistakes can cause a piece of equipment that is intended to be connected to redundant power sources to only be connected to one power source. For example, a data storage device is intended to be connected to multiple power sources for added reliability. The data storage device is intended to be connected to power supply A that is receiving power from power source A and power supply B that is receiving power from power source B. Instead, the operator connects the data storage device to power supply A and power supply C, which also receives power from power source A. Here, the data storage device is not connected to redundant power sources and is vulnerable to power loss at a single point of failure (power source A).

There is a mechanism by which a power source can transmit information along a power connection. For example, for a DC power supply, the voltage of the power connection can be slightly modulated within a tolerance of connected power supplies. For example, the voltage can be modulated by adding a modulated AC signal to it. For an AC power supply, the phase can be slightly modulated within the tolerance of connected power supplies, peak voltages can be modulated, or a transmission can be made at a lower or higher frequency, using either live or neutral connectors. These or any other mechanisms for transmitting information along a power connection can be used in conjunction with the embodiments described herein.

In an embodiment, a power source and a power consumer can communicate via a power connection to allow for checking of power source cabling errors. The communication can occur through a power connection cable connecting the power source and a power supply associated with the power consumer. The communication can convey information related to the power source from the power source to the power consumer. Additional communications can convey information related to the power consumer to the power source. In an embodiment, the information related to the power source can comprise a power source identifier that identifies the power source that the power consumer is receiving power from.

In an embodiment, a system can generate a power source identifier to be transmitted in a data transmission via a power connection, such as a power connection cable connecting the power source and the power consumer. A power source can transmit the data transmission to a power consumer via the power connection. The system can generate the data transmission so that every power source associated with a data center is associated with a unique power source identifier.

In an embodiment, a power consumer can be connected to multiple power connection cables. For each power connection, the connected power source can transmit a data transmission comprising the power source's unique power source identifier to the power consumer. Based on the power source identifiers transmitted and received, the system can determine whether the power consumer is connected to redundant power sources. For example, the system can compare a first power source identifier transmitted by the power source associated with a first power connection with a second power source identifier transmitted by the power source associated with a second power connection to determine whether the first and second power source identifiers are the same. In response to a determination that the power consumer is a part of redundant power connections and therefore lacks connection to redundant power sources (i.e., all power source identifiers are the same), the system can notify an operator or other administrator of a cabling mistake. The notification can alert the operator to the power consumer (e.g., piece of equipment) that has been incorrectly cabled. In another embodiment, the system can determine whether any of three or more power connections are redundant, and, in response to a determination that any of three or more power sources are redundant (i.e., two or more of the power source identifiers match) the system can notify an operator of a cabling mistake.

A power source provides power that is received by a power consumer over a power connection. A power consumer can be a piece of equipment in a data center. The power consumer can comprise a power supply that receives power from the power source. A power connection may further comprise one or more intermediary power consumers. The one or more intermediary power consumers can comprise a power supply that receives power from a power source. An intermediary power consumer can also act as a power source in that it transmits power to another power consumer. For example, an intermediary power consumer can be a power distribution unit (PDU), such as a floor PDU or a rack PDU.

A power source may provide either AC or DC power. In an embodiment, a power consumer may be configured to receive the opposite type of power. An intermediate power consumer, such as a PDU, can convert the either AC or DC power to the opposite type of power to be received by a subsequent power consumer. Data transmissions configured for either AC or DC power can be similarly converted. In response to a transmission of a data transmission in a first format associated with either AC or DC power, an intermediate power consumer, such as a PDU, can transform the data transmission from the first format to a second format associated with the opposite of AC or DC power. The resulting transformed data transmission can be transmitted from the intermediary power consumer to the end power consumer or to another subsequent power consumer. In an embodiment, the subsequent power consumer can be another intermediate power consumer.

In an embodiment, a data transmission comprising a power source identifier can also comprise other information related to the power source. The other information related to the power source can comprise one or more indicators. For example, the other information can comprise a source indicator that indicates of a type of the power source, such as whether the power source is a utility line or a battery. In an embodiment, the system can cause actions by the power consumer based on the other information related to the power source, such as the source indicator. In an embodiment, in response to the power consumer being determined by the system to have received a source indicator indicating that the power source is operating using battery power, the system can reduce a power draw of the power consumer.

In an embodiment, the other information can comprise a battery level indicator that indicates a charge level of the battery when the power source is a battery. In an embodiment, the system can cause actions by the power consumer based on the other information related to the power source, such as the battery level indicator. In response to the power consumer being determined to have received the data transmission comprising the battery level indicator, the system can determine whether the charge level of the battery is below a threshold level, and in response to determining that the charge level of the battery is below the threshold level, the system can initiate a shutdown procedure for the power consumer.

In an embodiment, the other information can comprise a current cost per unit of power indicator when the power source is line power. In an embodiment, the system can cause actions by the power consumer based on the other information related to the power source, such as the current cost per unit of power indicator. In response to the power consumer being determined to have received the current cost per unit of power indicator indicating that the current cost is above a threshold amount, the system can reduce a power draw of the power consumer. In an embodiment, the system can predict current power costs based on historical data and can schedule power-intensive operations for when power line cost is predicted to be below a threshold amount.

In an embodiment, the power source can receive one or more consumption data transmissions from one or more power consumers via the power connection cable wherein the consumption data transmissions comprise a consumption indicator that indicates a maximum power consumption of the associated power consumer. In an embodiment, a power source can determine, based on a total number of consumption data transmissions received, whether a combined power maximum of all power consumers connected to the power source exceeds a power maximum for the power source. In response to a determination that a combined power maximum of all power consumers connected to the power source exceeds a power maximum for the power source, the system can notify an operator that the power consumers connected to a power source require additional power.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100, 200, 300, 400, and 500 as illustrated at FIGS. 1-5, and/or systems thereof, can further comprise, be associated with and/or be coupled to one or more computer and/or computing-based elements described herein with reference to an operating environment, such as the operating environment 1100 illustrated at FIG. 11. In one or more described embodiments, computer and/or computing-based elements can be used in connection with implementing one or more of the systems, devices, components and/or computer-implemented operations shown and/or described in connection with FIG. 11 and/or with other figures described herein.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 illustrates an example system architecture 100 that can facilitate communication between a power source and associated power consumers, in accordance with an embodiment of this disclosure.

Discussion turns briefly to processor 102, memory 104 and bus 106 of system 100. For example, in one or more embodiments, the system 100 can comprise processor 102 (e.g., computer processing unit, microprocessor, classical processor, and/or like processor). In one or more embodiments, a component associated with system 100, as described herein with or without reference to the one or more figures of the one or more embodiments, can comprise one or more computer and/or machine readable, writable and/or executable components and/or instructions that can be executed by processor 102 to enable performance of one or more processes defined by such component(s) and/or instruction(s).

In one or more embodiments, system 100 can comprise a computer-readable memory (e.g., memory 104) that can be operably connected to the processor 102. Memory 104 can store computer-executable instructions that, upon execution by processor 102, can cause processor 102 and/or one or more other components of system 100 to perform one or more actions. In one or more embodiments, memory 104 can store computer-executable components.

System 100 and/or a component thereof as described herein, can be communicatively, electrically, operatively, optically and/or otherwise coupled to one another via bus 106. Bus 106 can comprise one or more of a memory bus, memory controller, peripheral bus, external bus, local bus, and/or another type of bus that can employ one or more bus architectures. One or more of these examples of bus 106 can be employed. In one or more embodiments, system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 100 can reside in the cloud, and/or can reside locally in a local computing environment (e.g., at a specified location(s)).

In addition to the processor 102 and/or memory 104 described above, system 100 can comprise one or more computer and/or machine readable, writable and/or executable components and/or instructions that, when executed by processor 102, can enable performance of one or more operations defined by such component(s) and/or instruction(s). System 100 can be associated with, such as accessible via, a computing environment 1100 described below with reference to FIG. 11. For example, system 1100 can be associated with a computing environment 1100 such that aspects of processing can be distributed between system 100 and the computing environment 1100.

The system 100 can comprise or be communicatively coupled to a power source 108. The power source can be, for example, line power (e.g., a utility line), a battery, or a generator. The power source 108 can be configured to transmit data transmissions comprising information related to the power source 108. For example, data transmission can comprise a power source identifier, power source type, battery charge level, battery time remaining, current cost per unit of power, or other information related to the power source 108.

The system 100 can comprise or be communicatively coupled to a power consumer 110. The power consumer can be configured to receive data transmissions from the power source 108. The power consumer 110 can receive data transmissions from the power source 108 via a power connection 112. The power consumer 110 can be a device. In an embodiment, the power consumer 110 can be equipment such as a server, a data storage unit, or other devices associated with information technology in a data center. In an embodiment, the power consumer 110 can be a PDU. The power consumer 110 can comprise a power supply that receives power and data transmissions. In an embodiment, the power supply of the power consumer 110 can receive power and data transmissions directly from the power source. In an embodiment, the power supply of the power consumer 110 can receive power from an intermediary power consumer as described with more detail in reference to FIG. 2 below. The power source 108 and the power consumer 110 can be connected by a power connection 112. The power connection 112 can be a power connection cable.

In an embodiment, the processor 102, memory 104, and bus 106 can be integrated with power source 108 and power consumer 110.

Figure 2:
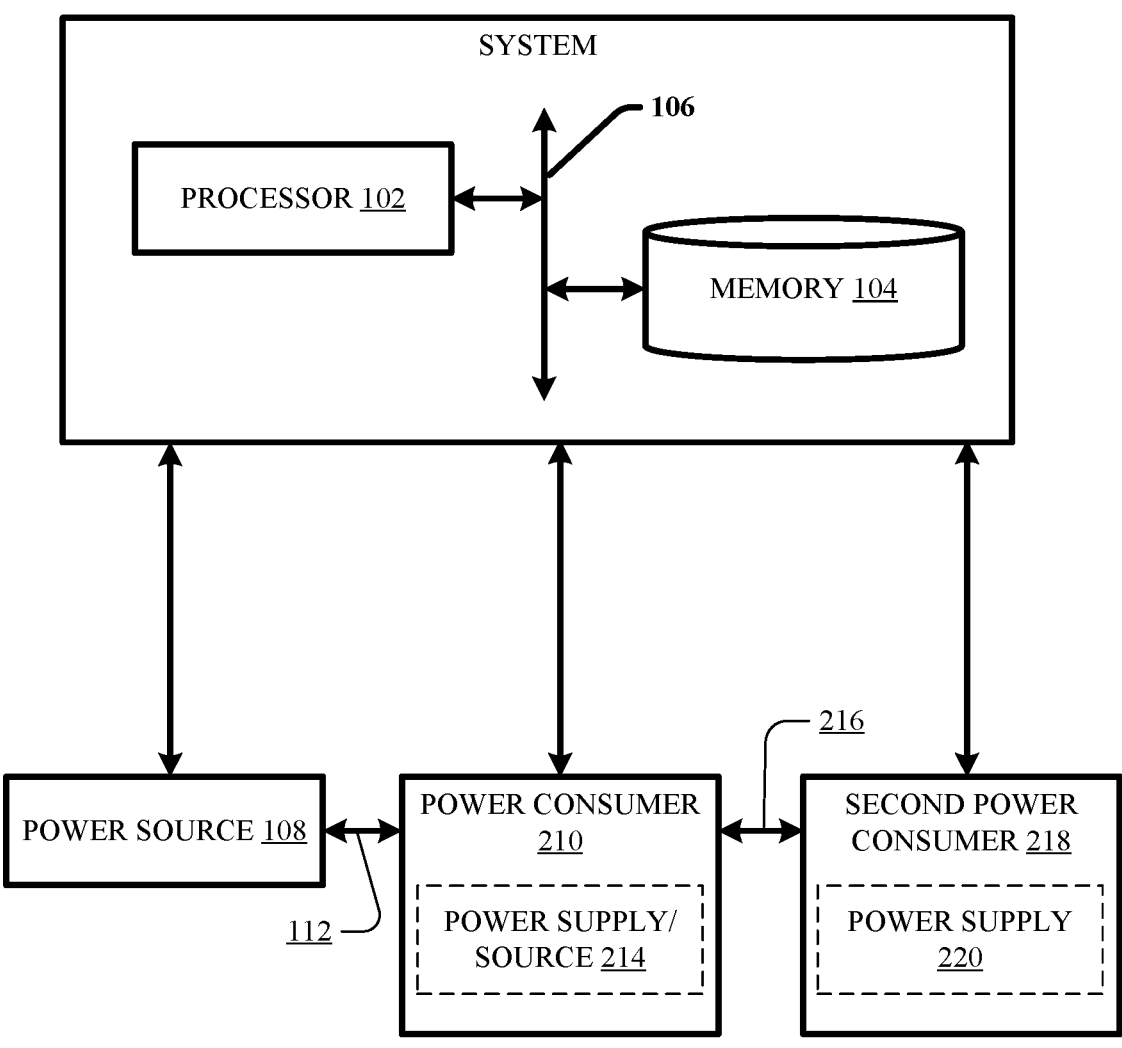
FIG. 2 illustrates another example system architecture that can facilitate communication between a power source and associated power consumers, in accordance with an embodiment of this disclosure.

FIG. 2 illustrates another example system architecture 200 that can facilitate communication between a power source and associated power consumers, in accordance with an embodiment of this disclosure. In some examples, part(s) of system architecture 200 can be used to implement part(s) of system architecture 100 of FIG. 1. Repetitive description of like elements and/or processes employed in respective embodiments is omitted for sake of brevity.

System architecture 200 comprises power consumer 210. Power consumer 210 can be a device. In an embodiment, power consumer 210 can be a PDU. Power consumer 210 comprises a power supply/source 214. Power consumer 218 can be a device. In an embodiment, the power consumer 218 can be equipment such as a server, a data storage unit, or other devices associated with information technology in a data center. Power consumer 218 comprises a power supply 220. The power consumer 210 and the second power consumer 218 can be connected by a power connection 216. The power connection 216 can be a power connection cable. In an embodiment, the power consumer 210 can act as an intermediary between the second power consumer 218 and the power source 108. For example, the power consumer 210 can convert DC electrical power into AC electrical power for use by the second power consumer. In an embodiment, the power consumer 210 can transform data transmissions from a first power format to a second power format. For example, a power source can transmit a data transmission comprising a power source identifier via a power connection cable using power in DC form. The data transmission is therefore also in DC form. The power consumer can convert the power to AC form and transform the data transmission to AC form as well. The power consumer can transmit the converted AC power and AC data transmission to the second power consumer. In another embodiment, the power consumer 210 acting as an intermediary consumer can be passive, so that the power and data transmission are not altered.

Figure 3:
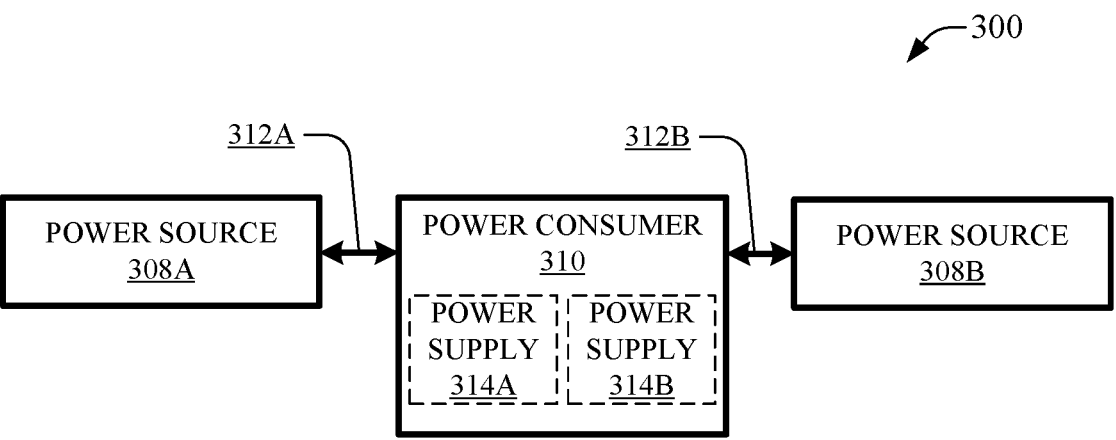
FIG. 3 illustrates another example system architecture that can facilitate communication between a power source and associated power consumers, in accordance with an embodiment of this disclosure.

FIG. 3 illustrates another example system architecture 300 that can facilitate communication between a power source and associated power consumers, in accordance with an embodiment of this disclosure. In some examples, part(s) of system architecture 300 can be used to implement part(s) of system architectures 100 and 200 of FIGS. 1 and 2. Repetitive description of like elements and/or processes employed in respective embodiments is omitted for sake of brevity.

System architecture 300 illustrates an example power consumer 310 comprising two power supplies power supply 314A and power supply 314B. Power supply 314A and power supply 314B can be separate hardware components. Power consumer 310 is connected to power source 308A via power connection 312A. In an embodiment, power consumer 310 is connected to power source 308A via power connection 312A at power supply 314A. Power consumer 310 is connected to power source 308B via power connection 312B. In an embodiment, power consumer 310 is connected to power source 308B via power connection 312B at power supply 314B. In various embodiments, the power consumer 310 can connect to any number of power sources. In an embodiment, the power consumer 310 can connect to a single power source via more than one power connection.

Figure 4:
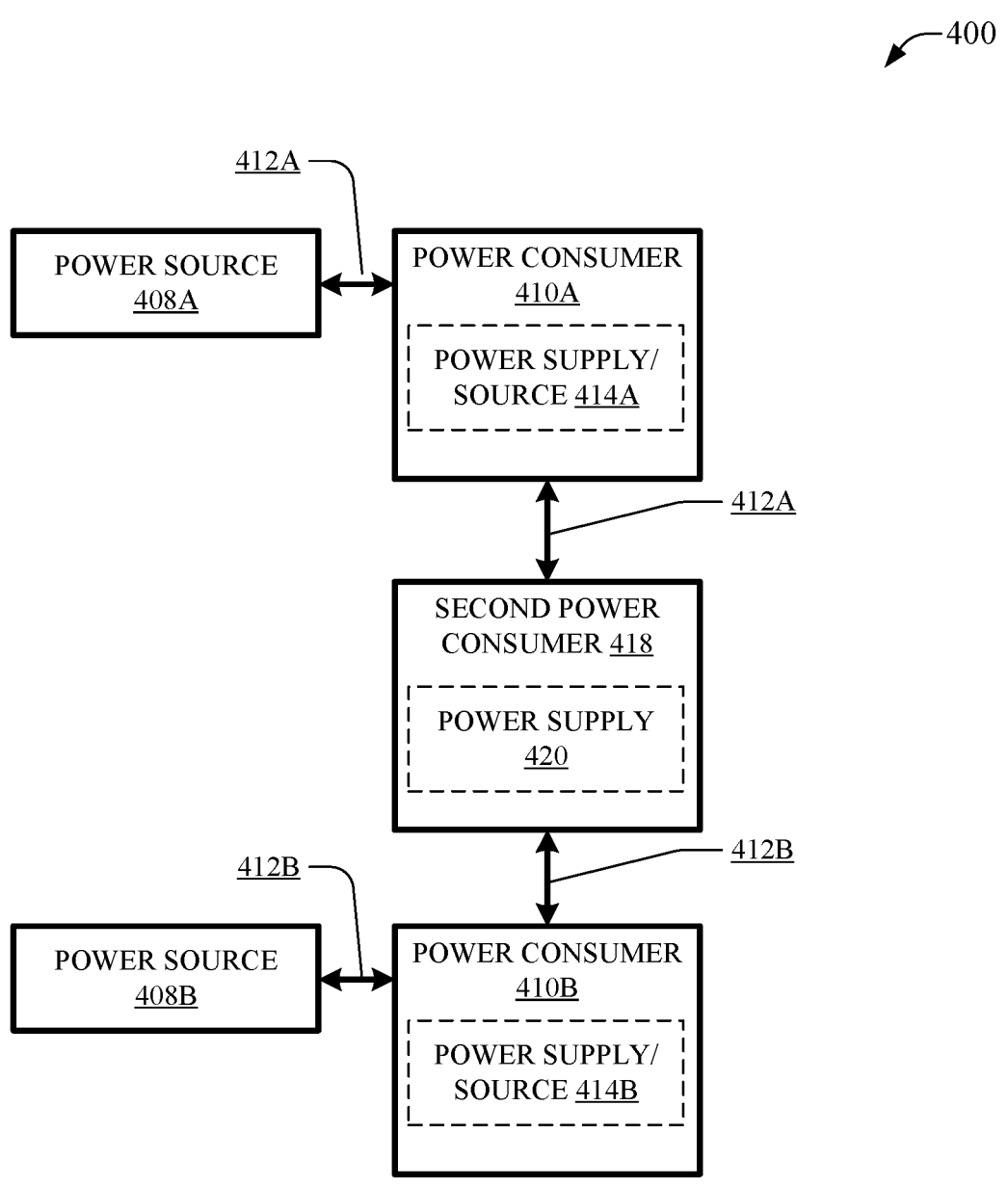
FIG. 4 illustrates another example system architecture that can facilitate communication between a power source and associated power consumers, in accordance with an embodiment of this disclosure.

FIG. 4 illustrates another example system architecture 300 that can facilitate communication between a power source and associated power consumers, in accordance with an embodiment of this disclosure. In some examples, part(s) of system architecture 400 can be used to implement part(s) of system architectures 100-300 of FIGS. 1-3. Repetitive description of like elements and/or processes employed in respective embodiments is omitted for sake of brevity.

The system 400 comprises a second power consumer 418. In an embodiment, the second power consumer 418 is a device in a data center, such as a data storage device. The second power consumer 418 is connected to two power connections 412A and 412B. The power connections 412A and 412B can comprise power connection cables. Power consumers 410A and 410B are intermediary power consumers, such as PDUs. Power source 108A is connected to power consumer 410A and second power consumer 418 via power connection 412A. Power source 108B is connected to power consumer 410B and second power consumer 418 via power connection 412B. In an embodiment, power source 108A and power source 108B can be the same power source. In an embodiment, second power consumer 418 can comprise more or less than two power connections.

Figure 5:
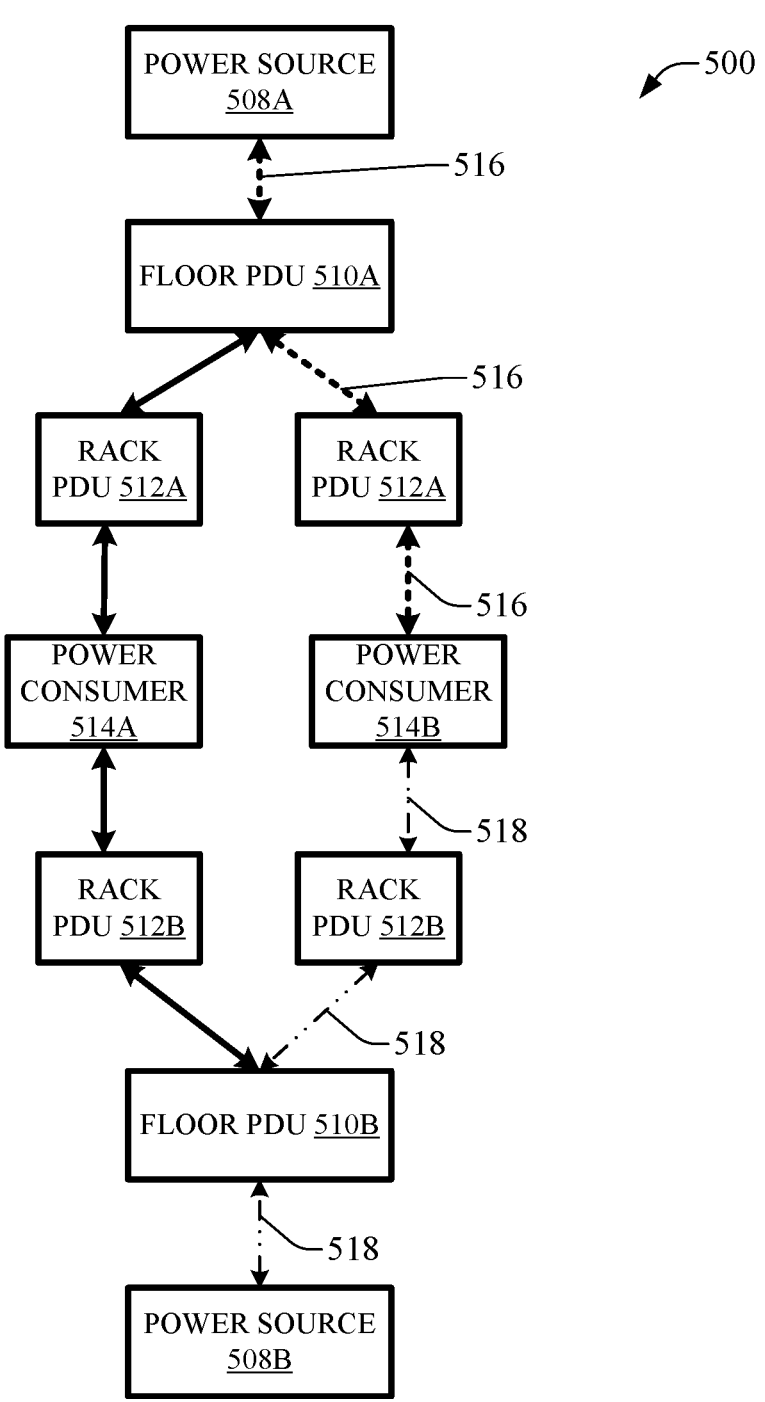
FIG. 5 illustrates another example system architecture that can facilitate communication between a power source and associated power consumers, in accordance with an embodiment of this disclosure.

FIG. 5 illustrates another example system architecture 500 that can facilitate communication between a source and associated power consumers, in accordance with an embodiment of this disclosure. In some examples, part(s) of system architecture 500 can be used to implement part(s) of system architectures 100-400 of FIGS. 1-4. Repetitive description of like elements and/or processes employed in respective embodiments is omitted for sake of brevity.

The system 500 illustrates power consumer 514A and power consumer 514B and their respective power connections. Power consumer B is connected via a power connection to rack PDUs 512A and 512B. Rack PDU 512A is connected via a power connection to floor PDU 510A. Floor PDU 510A is connected via a power connection to power source A. Rack PDU 512B is connected via a power connection to floor PDU 510B. Floor PDU 510B is connected via a power connection to power source B.

Power consumer B can receive data transmissions from both power source A and power source B. The data transmissions are preserved through the rack PDU and floor PDU connections as illustrated by power connections 516 and 518.

Example Process Flows

Figure 6:
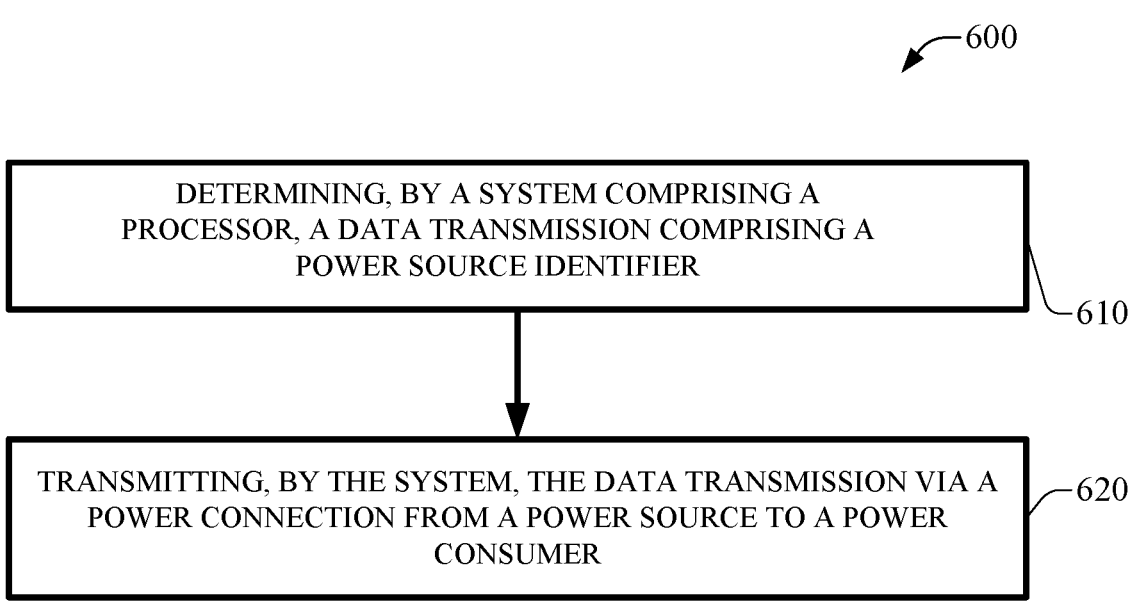
FIG. 6 illustrates another example process flow that can facilitate communication between a power source and associated power consumers, in accordance with an embodiment of this disclosure.

FIG. 6 illustrates an example process flow 600 that can facilitate communication between a power source and associated power consumers in accordance with an embodiment of this disclosure. In some examples, one or more embodiments of process flow 600 can be implemented by system 100 of FIG. 1, or computing environment 1100 of FIG. 11. Repetitive description of like elements and/or processes employed in respective embodiments is omitted for sake of brevity.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, and/or process flow 900 of FIG. 9.

At 610, example process flow 600 can comprise determining, by a system comprising a processor, a data transmission comprising a power source identifier.

At 620, example process flow 600 can comprise transmitting, by the system, the data transmission via a power connection from a power source to a power consumer.

FIG. 7 illustrates an example process flow 700 that can facilitate communication between a power source and associated power consumers, in accordance with an embodiment of this disclosure. In some examples, one or more embodiments of process flow 700 can be implemented by system 100 of FIG. 1, or computing environment 1000 of FIG. 10. Repetitive description of like elements and/or processes employed in respective embodiments is omitted for sake of brevity.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow process flow 600 of FIG. 6, process flow 800 of FIG. 8, and/or process flow 900 of FIG. 9.

At 710, example process flow 700 can comprise determining, by a system comprising a processor, a data transmission comprising a power source identifier.

At 720, example process flow 700 can comprise transmitting, by the system, the data transmission via a power connection from a power source to a first power consumer.

At 730, example process flow 700 can comprise transforming, by the first power consumer, the data transmission from a first format to a second format different from the first format, resulting in a transformed data transmission.

At 740, example process flow 700 can comprise transmitting, by the first power consumer, the transformed data transmission to a second power consumer.

FIG. 8 illustrates an example process flow 800 that can facilitate communication between a power source and associated power consumers, in accordance with an embodiment of this disclosure. In some examples, one or more embodiments of process flow 800 can be implemented by system 100 of FIG. 1, or computing environment 1000 of FIG. 10. Repetitive description of like elements and/or processes employed in respective embodiments is omitted for sake of brevity.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow process flow 600 of FIG. 6, process flow 700 of FIG. 7, and/or process flow 900 of FIG. 9.

At 810, example process flow 800 can comprise transmitting, to a power consumer, the data transmission comprising a first power source identifier via a power connection from a power source to a power consumer.

At 820, example process flow 800 can comprise transmitting a second data transmission comprising a second power source identifier to the power consumer via a second power connection.

At 830, example process flow 800 can comprise comparing the first power source identifier of the first data transmission and the second power source identifier of the second data transmission.

At 840, example process flow 800 can comprise determining whether the first power source identifier and the second power source identifier correspond to a same power source.

At 850, example process flow 800 can comprise in response to a determination that the first power source identifier and the second power source identifier correspond to the same power source, generating a message to notify an administrator via a device associated with the administrator.

FIG. 9 illustrates an example process flow 900 that can facilitate communication between a power source and associated power consumers, in accordance with an embodiment of this disclosure. In some examples, one or more embodiments of process flow 900 can be implemented by system 100 of FIG. 1, or computing environment 1000 of FIG. 10. Repetitive description of like elements and/or processes employed in respective embodiments is omitted for sake of brevity.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow process flow 600 of FIG. 6, process flow 700 of FIG. 7, and/or process flow 800 of FIG. 8. At 910, example process flow 900 can comprise receiving, by the system, one or more consumption data transmissions from one or more power consumers associated with the power source to the power source wherein a consumption data transmission of the one or more consumption data transmissions comprises a consumption indicator that indicates a maximum power consumption of the power consumer.

At 920, example process flow 900 can comprise determining, by the system, an overall maximum power consumption associated with the power source based on the one or more consumption data transmissions.

At 930, example process flow 900 can comprise comparing, by the system, the overall maximum power consumption to a threshold power.

At 940, example process flow 900 can comprise determining, by the system, whether the maximum power consumption exceeds the threshold power associated with the power source.

At 950, example process flow 900 can comprise in response to determining that the overall maximum power consumption exceeds the threshold power, generating, by the system, a message to notify an administrator via a device associated with the administrator.

Example Operating Environment

While the embodiments have been described above in the general context of computer-executable instructions that can run on one or more computers, those skilled in the art will recognize that the embodiments can be also implemented in combination with other program modules and/or as a combination of hardware and software.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively test patch artifacts for incompatibilities and for a variety of performance criteria as the one or more embodiments described herein can enable this process. And, neither can the human mind nor a human with pen and paper generate snapshots of a computing system at various stages during a software testing process for testing the incompatibilities and performances of the patch artifacts, as conducted by one or more embodiments described herein.

Figure 10:
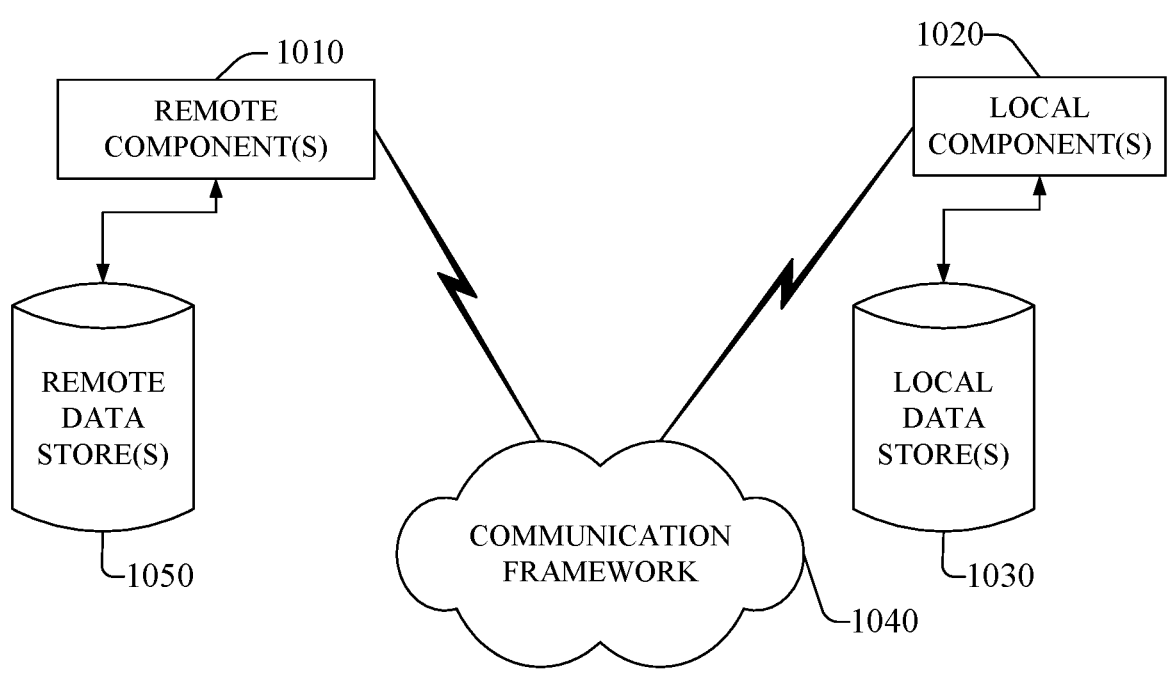
FIG. 10 depicts an example schematic block diagram of a computing environment with which the disclosed subject matter can interact.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

In order to provide a context for the various elements of the disclosed subject matter, the following discussion is intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1120 (see below), non-volatile memory 1122 (see below), disk storage 1124 (see below), and memory storage, e.g., local data store(s) 1030 and remote data store(s) 1050, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. One or more embodiments described and suggested herein can also be practiced in distributed computing environments where tasks are performed by remote processing devices that are linked through a communications network; however, some if not all parts of the subject disclosure can be practiced on stand-alone computers. In a distributed computing environment, program modules can be located in both local and remote memory storage devices.

Figure 11:
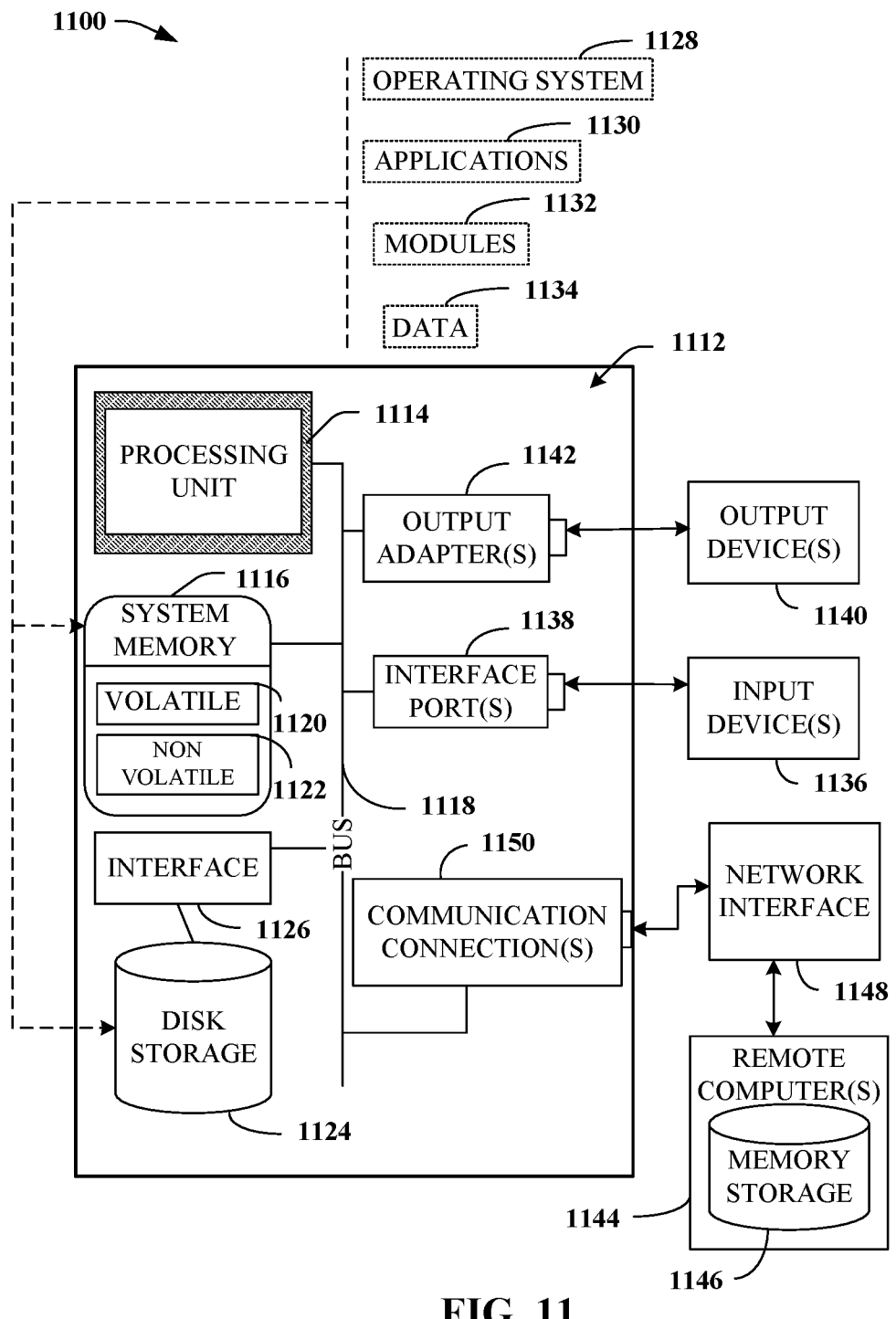
FIG. 11 illustrates an example block diagram of a computing system operable to execute the disclosed systems and methods in accordance with an embodiment.

FIG. 11 illustrates a block diagram of a computing system 1100 operable to execute the disclosed systems and methods in accordance with an embodiment. Computer 1112 can comprise a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1116 can comprise volatile memory 1120 and nonvolatile memory 1122. A basic input/output system, containing routines to transfer information between elements within computer 1112, such as during start-up, can be stored in nonvolatile memory 1122. By way of illustration, and not limitation, nonvolatile memory 1122 can comprise read only memory, programmable read only memory, electrically programmable read only memory, electrically erasable read only memory, or flash memory. Volatile memory 1120 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1112 can also comprise removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, flash memory card, or memory stick. In addition, disk storage 1124 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112.

System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1112. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 comprise, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial bus port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 comprise, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1112. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHZ) and infrared (IR) waves, and are sometimes referred to as extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A data center device, comprising:
at least one power supply;
at least one processor; and
at least one memory that stores executable instructions that, when executed by the at least one processor, facilitate performance of operations, comprising:
receiving, from power connection cables of a group of power connection cables connected to the at least one power supply, respective data transmissions comprising respective power source identifiers associated with respective power sources supplying respective power to the power connection cables;
determining whether the any of the power source identifiers are different; and
based on a determination that none of the power source identifiers are different:
determining that the respective power sources are a same power source, and
transmitting an alert to an operator associated with the data center device, wherein the alert indicates a cabling mistake.

2. The data center device of claim 1, wherein the at least one power supply comprises a group of power supplies, and wherein at least two power supplies of the group of power supplies are connected to different power connection cables of the group of power connection cables.

3. The data center device of claim 1, wherein the operations further comprise:
transforming at least one of the respective data transmissions from a first format to a second format different from the first format, resulting in at least one respective transformed data transmission; and
transmitting the at least one respective transformed data transmission to at least one other data center device that is different from the data center device.

4. The data center device of claim 1, wherein the alert further indicates that the power connection cables are not configured respectively for providing distinct power from distinct power sources.

5. The data center device of claim 1, wherein at least one of the respective data transmissions further comprises a source indicator that indicates whether the same power source is operating using battery power or line power.

6. The data center device of claim 5, wherein at least one of the respective data transmissions further comprises a battery level indicator that indicates a charge level of the power source being determined to be operating using the battery power.

7. The data center device of claim 6, wherein the operations further comprise:
determining whether the charge level of the same power source is below a threshold level; and
in response to determining that the charge level of the same power source is below the threshold level, initiating a shutdown procedure for the data center device.

8. The data center device of claim 5, wherein at least one of the respective data transmissions further comprises a current cost per unit of power indicator based on the same power source being determined to be operating using the line power.

9. The data center device of claim 5, wherein the operations further comprise:

in response to the source indicator indicating that the same power source is operating using the battery power, reducing a power draw of the data center device.

10. A method, comprising:
receiving, by a data center device comprising at least one processor and at least one power supply, from power connection cables of a group of power connection cables connected to the at least one power supply, respective data transmissions comprising respective power source identifiers associated with respective power sources supplying respective power to the power connection cables;
determining, by the data center device, whether the any of the power source identifiers are different; and
based on a determination that none of the power source identifiers are different:
determining, by the data center device, that the respective power sources are a same power source, and
transmitting, by the data center device, a notification to an operator associated with the data center device, wherein the notification indicates a cabling mistake.

11. The method of claim 10, wherein the at least one power supply comprises a group of power supplies, and wherein at least two power supplies of the group of power supplies are connected to different power connection cables of the group of power connection cables.

12. The method of claim 10, further comprising:
transforming, by the data center device, at least one of the respective data transmissions from a first format to a second format different from the first format, resulting in at least one respective transformed data transmission; and
transmitting, by the data center device, the at least one respective transformed data transmission to at least one other data center device that is different from the data center device.

13. The method of claim 10, wherein the notification further indicates that the power connection cables are not configured respectively for providing distinct power from distinct power sources.

14. The method of claim 10, wherein at least one of the respective data transmissions further comprises a source indicator that indicates whether the same power source is operating using battery power or line power.

15. The method of claim 14, wherein at least one of the respective data transmissions further comprises a battery level indicator that indicates a charge level of the power source being determined to be operating using the battery power.

16. The method of claim 15, further comprising:
determining, by the data center device, whether the charge level of the same power source is below a threshold level; and
in response to determining that the charge level of the same power source is below the threshold level, initiating, by the data center device, a shutdown procedure for the data center device.

17. The method of claim 14, wherein at least one of the respective data transmissions further comprises a current cost per unit of power indicator based on the same power source being determined to be operating using the line power.

18. The method of claim 14, further comprising:
in response to the source indicator indicating that the same power source is operating using the battery power, reducing, by the data center device, a power draw of the data center device.

19. A non-transitory computer-readable medium comprising instructions that, in response to execution, cause a data center device comprising at least one processor and at least one power supply to perform operations, comprising:

receiving, from power connection cables of a group of power connection cables connected to the at least one power supply, respective data transmissions comprising respective power source identifiers associated with respective power sources supplying respective power to the power connection cables;

determining whether the any of the power source identifiers are different; and based on a determination that none of the power source identifiers are different:

determining that the respective power sources are a same power source, and transmitting a notification to an operator associated with the data center device, wherein the notification indicates a cabling mistake.

20. The non-transitory computer-readable medium of claim 19 wherein the at least one power supply comprises a group of power supplies, and wherein at least two power supplies of the group of power supplies are connected to different power connection cables of the group of power connection cables.

\* \* \* \* \*